(12) United States Patent
Lankinen et al.

(10) Patent No.: US 8,992,841 B2
(45) Date of Patent: Mar. 31, 2015

(54) FLUIDIZED BED REACTOR

(75) Inventors: Pentti Lankinen, Varkaus (FI); Pertti Kinnunen, Varkaus (FI); Teemu Nevalainen, Varkaus (FI)

(73) Assignee: Foster Wheeler Energia Oy, Espoo (FI)

( * ) Notice: Subject to any disclaimer, the term of this patent is extended or adjusted under 35 U.S.C. 154(b) by 641 days.

(21) Appl. No.: 13/376,472

(22) PCT Filed: Jun. 11, 2010

(86) PCT No.: PCT/FI2010/050490
§ 371 (c)(1),
(2), (4) Date: Jan. 20, 2012

(87) PCT Pub. No.: WO2010/142861
PCT Pub. Date: Dec. 16, 2010

(65) Prior Publication Data
US 2012/0134882 A1 May 31, 2012

(30) Foreign Application Priority Data
Jun. 12, 2009 (FI) .................................. 20095674

(51) Int. Cl.
*B01J 8/18* (2006.01)
*B01J 8/00* (2006.01)
(Continued)

(52) U.S. Cl.
CPC .............. *B01J 8/1836* (2013.01); *B01J 8/0055* (2013.01); *F23C 10/002* (2013.01); *F23C 10/10* (2013.01); *F23C 10/18* (2013.01); *B01J 2208/00194* (2013.01)
USPC .............. 422/146; 422/147; 110/245; 122/4 D (58) Field of Classification Search
USPC .................... 422/146, 147; 110/245; 122/4 D
See application file for complete search history.

(56) References Cited

U.S. PATENT DOCUMENTS

| | | | |
|---|---|---|---|
| 3,233,597 A | 2/1966 | Svendsen | |
| 4,183,330 A | 1/1980 | Bryers et al. | |

(Continued)

FOREIGN PATENT DOCUMENTS

| | | |
|---|---|---|
| FR | 697760 A | 1/1931 |
| JP | 57-94333 A | 6/1982 |

(Continued)

OTHER PUBLICATIONS

Russian Decision on Grant dated May 13, 2013, issued in corresponding Russian Patent Application No. 2012100759/04.

(Continued)

*Primary Examiner* — Lessanework Seifu
(74) *Attorney, Agent, or Firm* — Fitzpatrick, Cella, Harper & Scinto (57) ABSTRACT

A fluidized bed reactor includes a bottom portion, a roof portion, and side walls vertically extending between the bottom portion and the roof portion, forming a reaction chamber of the reactor. At least one side wall of the reaction chamber forms at least one vertical indentation in the reaction chamber, which indentation extends from the plane of the at least one side wall towards the reaction chamber. The indentation extending from the plane of the at least one side wall towards the reaction chamber is formed of a portion of the at least one side wall, protruding from the plane of the at least one side wall towards the reaction chamber, and the portion of the at least one side wall includes at least two substantially vertical indenting wall portions deviating from the plane of the at least one side wall at vertical lines within a distance from each other.

19 Claims, 7 Drawing Sheets

(51) Int. Cl.
*F23C 10/00* (2006.01)
*F23C 10/10* (2006.01)
*F23C 10/18* (2006.01)

(56) References Cited

U.S. PATENT DOCUMENTS

| | | | |
|---|---|---|---|
| 4,314,967 A | 2/1982 | Kwon et al. | |
| 4,672,918 A * | 6/1987 | Engstrom et al. | 122/4 D |
| 5,101,773 A | 4/1992 | White | |
| 5,203,284 A | 4/1993 | Dietz | |
| 5,707,591 A | 1/1998 | Semedard et al. | |
| 6,470,833 B1 | 10/2002 | Hyppanen | |
| 2005/0256860 A1 | 11/2005 | Eiron et al. | |

FOREIGN PATENT DOCUMENTS

| | | |
|---|---|---|
| JP | 8-178212 A | 7/1996 |
| JP | 2002-221302 A | 8/2002 |
| RU | 2060429 C1 | 5/1996 |
| RU | 2119119 C1 | 9/1998 |
| SU | 1712422 A2 | 2/1992 |
| WO | 2007/068802 A2 | 6/2007 |
| WO | 2008/110592 A1 | 9/2008 |
| WO | 2008/119753 A1 | 10/2008 |
| WO | 2010/009837 A2 | 1/2010 |

OTHER PUBLICATIONS

Japanese Official Action dated Jun. 28, 2013, issued in Japanese Patent Application No. 2012-514505, with an English translation.
Russian Official Action dated Feb. 22, 2013, issued in counterpart Russian Patent Application No. 201200759/04, with an English translation.
Notification of and International Search Report mailed Nov. 30, 2010, in counterpart International Application No. PCT/FI2010/050490.
Written Opinion of the International Searching Authority mailed Nov. 30, 2010, in counterpart International Application No. PCT/FI2010/050490.
Written Reply filed Apr. 11, 2011, in the European Patent Office, in counterpart International Application No. PCT/FI2010/050490.
Notification of and International Preliminary Report on Patentability mailed Aug. 18, 2011, in counterpart International Application No. PCT/FI2010/050490.

* cited by examiner

FLUIDIZED BED REACTOR

This application is a U.S. national stage application of PCT International Application No. PCT/FI2010/050490, filed Jun. 11, 2010, published as International Publication No. WO 2010/142861 A2, and which claims priority from Finnish patent application number 20095674, filed Jun. 12, 2009.

FIELD OF THE INVENTION

The present invention relates to a fluidized bed reactor having a reaction chamber in which at least one side wall of the reaction chamber forms at least one indentation in the chamber, which indentation is substantially vertical and extends from the plane of the side wall towards the reaction chamber.

BACKGROUND OF THE INVENTION

The reaction chamber of a fluidized bed reactor typically comprises an inner portion having a rectangular horizontal cross section, defined by four side walls, a bottom portion and a roof portion, wherein solid material and bed material containing, for example, fuel, are fluidized by means of fluidizing gas introduced through the bottom, the fluidizing gas usually being oxygenous primary gas required for exothermic chemical reactions taking place in the reaction chamber. The inner portion of the reaction chamber is usually called a furnace and the reactor a fluidized bed boiler, when a combustion process is performed in the reactor. The side walls of the furnace typically also have connections for the introduction of, at least, fuel and secondary air.

The side walls of the furnace are usually manufactured of panels formed of tubes and fins therebetween, whereby energy being released in the chemical reactions of the fuel is used for evaporating water flowing in the tubes. Often, there are also superheating surfaces arranged in the fluidized bed reactor to further increase the energy content of the steam.

When aiming to manufacture a high capacity boiler, for example, one on the order of several hundreds of megawatts, a large reaction volume and a lot of evaporating and superheating surfaces are required. Such a high capacity fluidized bed boiler is disclosed in U.S. Pat. No. 6,470,833 B1. The basal area of the boiler is directly proportional to the capacity of the boiler, on the basis of the required volume and velocity of the fluidization air. As it is at least structurally disadvantageous to have a very long and narrow bottom of the furnace, the height of the boiler and the width of the boiler bottom also have to be increased in order to have enough evaporation surfaces on the side walls. The increase of the height may significantly lead to constructional difficulties, and the increase of the width can make it difficult to arrange homogeneous feed of the fuel and secondary air. It can be difficult to form sufficiently strong and rigid side walls extending from the bottom to the roof of a high furnace, as the side walls are considerably thin relative to their height.

It is especially challenging to realize a high-efficiency once-through fluidized bed boiler. The increase of the cross-sectional area of the furnace makes it challenging to maintain uniform behavior of the fluidized bed. This means, in practice, that the heat surfaces of the furnace tend to be affected by a varying fluidized bed, depending, for example, on the structures of the grid and the lower portion of the furnace and the control of the process. It is important for the reliable operation of the once-through fluidized bed boiler that the evaporation of water in the tubes of the evaporator surfaces is homogeneous enough in the different portions of the furnace walls. In large fluidized bed boilers, especially, in the once-through fluidized bed boilers, the uniformity of the fluidized bed has an even bigger meaning. Especially, the inner corners of a large boiler are areas, in which the effect of the fluidized bed on the evaporation is easily different from that in the other areas.

SUMMARY OF THE INVENTION

An object of the invention is to improve the prior art technique by providing a fluidized bed reactor that better enables the manufacture of a large, high-efficiency boiler.

It is also an object of the invention to provide a once-through fluidized bed boiler having a more reliable operation than before.

The objects of the invention are obtained by providing a fluidized bed reactor comprising a bottom portion, a roof portion and side walls vertically extending between the bottom portion and the roof portion, forming a reaction chamber of the fluidized bed reactor, and a solids separator in connection with the reaction chamber, and wherein at least one side wall of the reaction chamber forms at least on indentation in the reaction chamber, which indentation is substantially vertical and extends from the plane of the side wall towards the reaction chamber.

Such a side wall of a fluidized bed reactor has an improved rigidity, whereby it is possible to increase the horizontal length of the side wall without substantially losing the rigidness of the wall.

The indentation preferably forms a space outside the side wall of the reactor extending from the plane of the side wall towards the reaction chamber. In this manner, it is possible to provide the indentation with an access to and/or a space for auxiliary equipment of the reactor. The structure of the side wall is preferably, near the indentation, substantially similar to the structure of the side wall elsewhere in the region.

According to an embodiment of the invention, the indentation exceeds vertically throughout the length of the side wall between the bottom portion and the roof portion. In this embodiment, the rigidity of the wall is improved throughout the vertical length of the side wall. At the same time, there is formed an indentation towards the reaction chamber extending vertically throughout the length of the side wall, through which it is possible to feed different material flows directly closer to the center of the fluidized bed in the reactor.

According to a preferred embodiment of the invention, the side walls and the indentations are water tube walls, to which heat can be transferred from the reaction chamber. Thereby, the indentations increase the total heat surface significantly and thus enable higher efficiency for the heat transfer from the surface.

Two opposing side walls of the reaction chamber preferably comprise at least one substantially vertical indentation extending from the plane of the side wall towards the reaction chamber. According to a preferred embodiment, the two opposing walls of the reactor, comprising an indentation according to the invention, are horizontally longer than the other two opposing walls of the reactor.

According to a preferred embodiment of the invention, the fluidized bed reactor is at least partially supported by a supporting structure, which supporting structure comprises a vertical column, arranged to be supported at least partially by a foundation underneath the fluidized bed reactor. Thereby, the vertical supporting columns are preferably arranged at least partially within the vertical indentations. Thus, the horizontal distance between the columns becomes shorter than the distance between the planes of the side walls of the reaction chamber, whereby the span of the supporting structure connecting the columns and supporting the fluidized bed reactor is smaller than before.

The indentation of the side wall extending to the reaction chamber is formed of a portion of the side wall protruding from the plane of the side wall towards the reaction chamber in such a way that the portion of the side wall comprises at least two substantially vertical indenting wall portions, deviating from the plane of the side wall at vertical lines within a distance from each other. Thus, the indentation is formed to open outside the reaction chamber and there is a usable space formed in the indentation. The distance between the vertical lines is preferably at least 1 m. Furthermore, it is advantageous that the at least two substantially vertical indenting wall portions extend for a distance towards the reaction chamber, which distance is at least twice the distance between the vertical lines. The at least two substantially vertical indenting wall portions are preferably planar.

According to another embodiment of the invention, the edges on the reaction chamber side of the at least two substantially vertical indenting wall portions are connected with each other by an end portion forming an indentation, which is quadrangular of a horizontal cross section.

According to a preferred embodiment, an indentation comprises means for introducing oxygenous reaction gas to the reaction chamber above the bottom portion and/or means for introducing fuel to the reaction chamber and/or at least one sensor for measuring a quantity related to a reaction taking place in the reaction chamber.

According to another embodiment, the at least two substantially vertical indenting wall portions are in an angle deviating from the normal of the plane of the side wall in such a way that they extend towards the reaction chamber forming a wedge-like or triangular indentation. Preferably, the wedge-like indentations are arranged facing each other on the opposing side walls of the reaction chamber and, further, corner surfaces, in other words, beveled portions, corresponding to the dimensions of the indenting portions, are arranged to the end corners of the reaction chamber. Thus, a reaction chamber formed by successive zones with an octagonal horizontal cross section is formed in the reactor. Such a reaction chamber is preferably provided with inlets for feeding reaction gas through the indentations and directed in such a manner that, in each of the octangonal zones, the inlet for reaction gas facilitates the generation of a vortex having a vertical central axis. Preferably, the indentations comprise means for introducing reaction gas to the reaction chamber in such a manner that the means are directed to such a position relative to the side wall plane that the introduction of the reaction gas facilitates the generation of the vertical vortex in the reaction chamber when it is in operation.

An indentation or indentations are preferably arranged facing each other on the two opposing side walls of the reactor.

According to another embodiment, the invention is related to a once-through fluidized bed reactor, preferably, a once-through fluidized bed boiler, comprising a bottom portion, a roof portion and side walls vertically extending between the bottom portion and the roof portion forming a reaction chamber for the fluidized bed reactor, and a solids separator in connection with the reaction chamber. Two opposing side walls of the reaction chamber of such a once-through fluidized bed reactor are usually horizontally longer than the two other side walls. The cross section of the reaction chamber is thus substantially rectangular. The side walls forming the reaction chamber comprise heat surfaces, preferably, water tube walls, connected to be part of the evaporation system of a once-through boiler. Preferably, the two opposing longer side walls of the reaction chamber of the once-through fluidized bed boiler comprise at least one indentation extending towards the reaction chamber, which indentation is arranged substantially throughout the vertical length of the side wall.

In order to balance the effects of the fluidized bed on the evaporation, the inner corners of the reaction chamber are provided with the beveled portions, which connect the adjacent side walls, and which are connected with adjacent side walls to a common evaporation system of the once-through boiler. The beveled portions are preferably planar and extend throughout the vertical length of the side wall.

Preferably, the indentations of the opposing side walls of the reaction chamber face each other, whereby at least two adjacent zones are formed in the reaction chamber. Advantageously, each inner corner of each zone of the reaction chamber comprises a beveled portion. Thereby, the inner corners on the reaction chamber side of the indenting wall portions of the indentations are also provided with beveled portions.

Other characteristic features of the invention become evident in the accompanying claims and in the following description of the embodiments of the figures.

BRIEF DESCRIPTION OF THE DRAWINGS

The invention is described below with reference to the accompanying schematic drawings, in which.

DETAILED DESCRIPTION OF THE PREFERRED EMBODIMENTS

Figure 1:
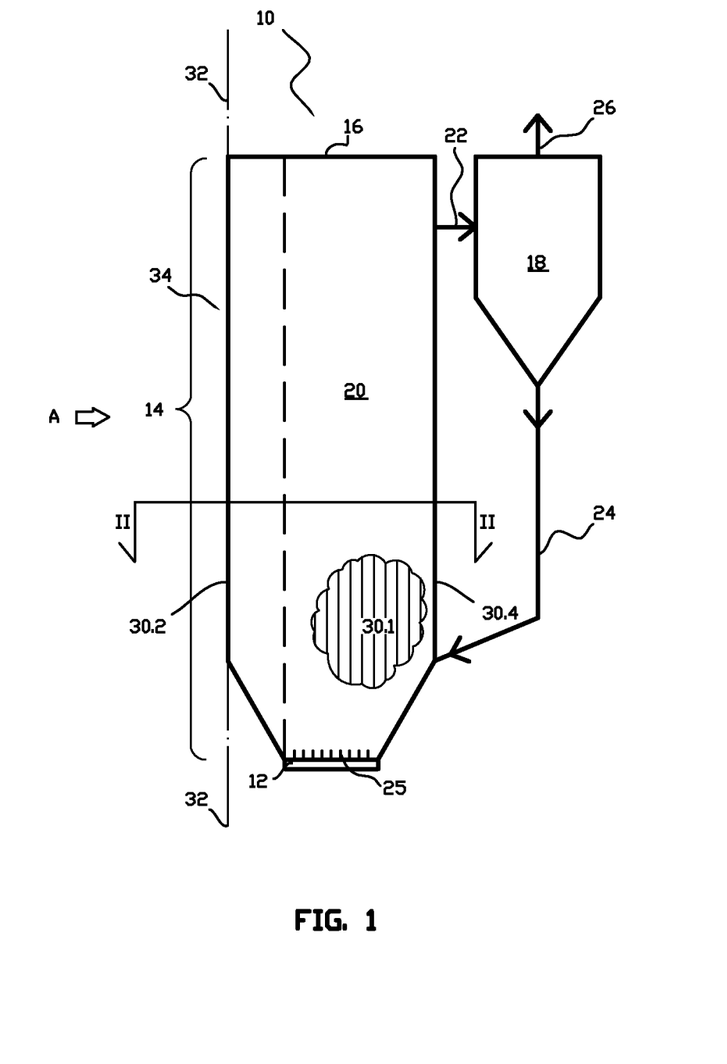
FIG. 1 is a schematic view of an embodiment of a fluidized bed reactor in accordance with the invention.
Figure 2:
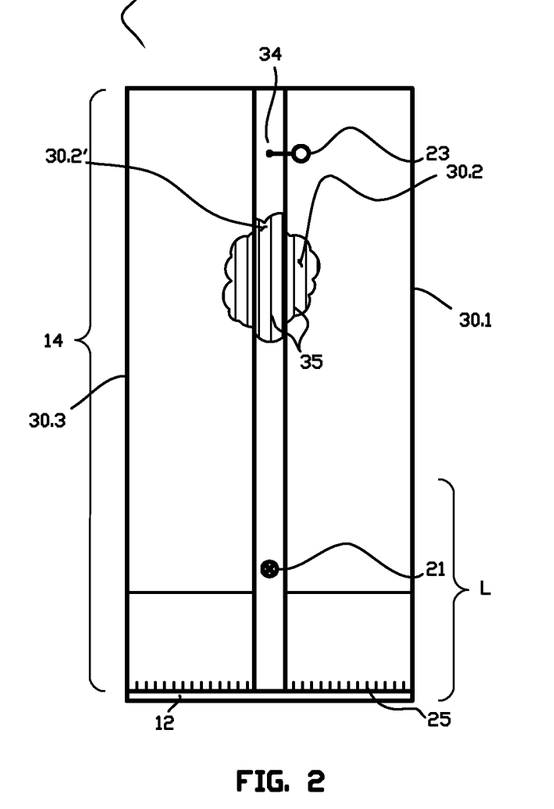
FIG. 2 is a schematic view of the fluidized bed reactor of FIG. 1 in direction A.
Figure 3:
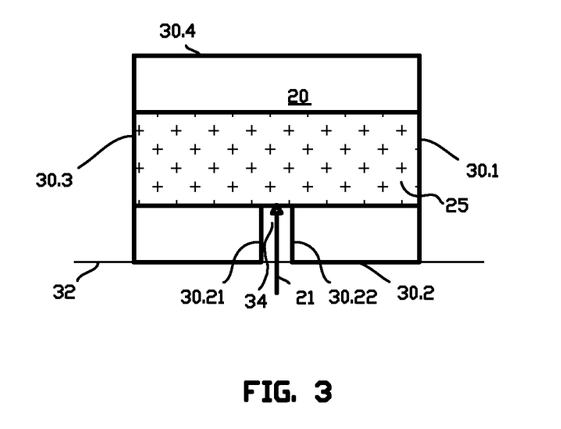
FIG. 3 is a schematic view of section II-II of FIG. 1.

FIGS. 1, 2 and 3 schematically illustrate an embodiment of a fluidized bed reactor 10 in accordance with the invention, which, herein, is a circulating fluidized bed boiler. The circulating fluidized bed boiler 10 comprises a bottom portion 12, a roof portion 16 and side walls 14 extending vertically between the bottom portion 12 and the roof portion 16. The two opposing side walls 14 comprise an inclined lower portion. It is clear that the fluidized bed reactor 10 comprises numerous parts and elements that are not, for the sake of clarity, illustrated herein. FIG. 2 is a view of the fluidized bed reactor 10 of FIG. 1 in direction A and FIG. 3 illustrates a horizontal section II-II of the fluidized bed reactor 10 of FIG. 1. For the sake of clarity, FIGS. 2 and 3 do not show a solids separator, either.

The bottom portion 12, the roof portion 16 and the side walls 14 form a reaction chamber 20, which is a furnace, in a case that the reactor is a boiler. The bottom portion 12 also includes a grid 25, through which, for example, fluidizing gas is introduced to the reactor 10. The circulating fluidized bed reactor 10 further comprises a solids separator 18, which is, typically, a cyclone separator. The solids separator 18 is connected by a gas channel 22 to the upper portion of the reaction chamber 20, in the vicinity of the roof portion 16, whereby a mixture of reaction gas and solid material can flow along the gas channel to the solids separator 18. Solid material is separated from gas in the solids separator 18, which is, after a possible treatment, such as cooling, led back to the reaction chamber 20, i.e., to the furnace. Therefore, the solids separator 18 is connected to the lower portion of the reaction chamber 20 by means of a return channel 24. The gas, of which solid material has been separated, is led in the system for further treatment through a gas discharge connection 26.

The reaction chamber 20 is herein formed of four side walls 30.1, 30.2, 30.3, and 30.4. One of the side walls 30.2 forms at least one indentation 34 to a side wall 30.1 relative to the reaction chamber 20. The indentation 34 is substantially vertical and extends from the plane 32 of the side wall towards the reaction chamber 20. The indentation 34 forms an exterior space relative to the reaction chamber 20. The side wall 30.2 forming an indentation 34 means, for example, that the indentation 34 is open outwards, in other words, the indentation 34 forms a space that is accessible from outside, i.e., it opens to the opposed side of the wall relative to the reaction chamber 20. It is, for example, possible to arrange supporting structures of the boiler to the space. Such an indentation 34 significantly makes the side wall more rigid and also renders possible to utilize the space, for example, for the operation of a fluidized bed reactor 10, such as for the location of auxiliary equipment of the reactor 10.

As is illustrated in FIG. 2, a side wall 30.2 and an indenting wall portion 30.2' forming the indentation 34 are formed of a cooled structure 35, for example, of water tube walls. The structure of the water tube wall may vary as such, but it typically comprises a gas-tight structure formed by tubes and fins connecting them. As a cooled structure, the indentation 34 also acts as a heat surface of the furnace, whereby, at the same time with the formation of the rigid side walls structure by bending a portion of the water tubes of the side wall to extend towards the reaction chamber, as an indentation 34 opening outwards, in accordance with the invention, it is possible to significantly increase the amount of heat surface of the reactor 10. According to an embodiment of the invention, indentations 34 in accordance with the invention are used to form even more than 20% of the heat surfaces of the furnace. Especially, in a once-through boiler connection, the horizontal connection point of the water tube wall is in the tubes forming the indentation and the side walls, respectively, substantially at the same level, both in the lower portion and in the upper portion of the water tube wall.

The indentation 34 vertically extends in the embodiment of FIGS. 1 and 2, at least throughout the length of the side wall between the bottom portion 16 and the roof portion 12. The indentation 34 here extends to the junction of the inclined side walls and the grid, whereby the indentation 34 does not cover the grid. Though for the sake of clarity, FIGS. 1-3 illustrates only one indentation 34 on one side wall, it is, however, advantageous to arrange indentations to at least two opposing side walls in such a manner that the number of indentations is determined, for example, by the horizontal length of the side wall.

Figure 4:
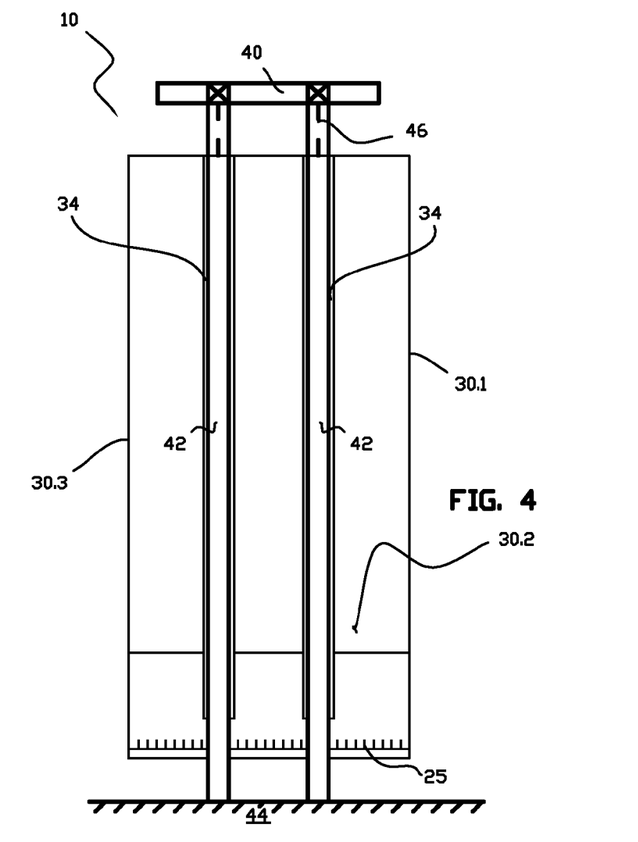
FIG. 4 is a schematic view of another embodiment of a fluidized bed reactor in accordance with the invention in direction A.
Figure 5:
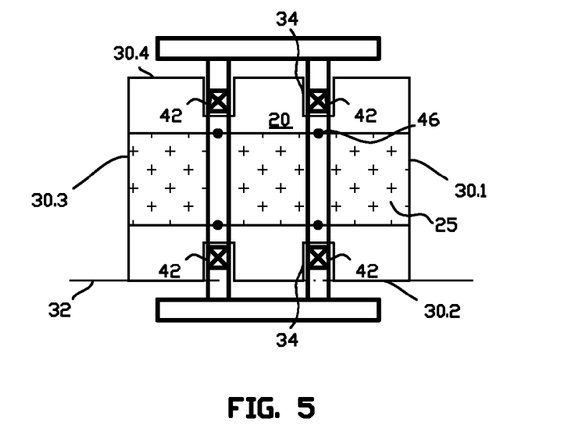
FIG. 5 is a schematic horizontal cross-sectional view of FIG. 4.

FIGS. 4 and 5 illustrate a side view and a top view, respectively, of a fluidized bed reactor 10 in accordance with another embodiment of the invention. A solids separator(s) has/have also been left out here for the sake of clarity. Here, two opposing side walls 30.2, 30.4 form, on both side walls, numerous indentations 34 extending to the reaction chamber 20. The indentations 34 facing each other are arranged on opposing walls. Also, here, the indentations 34 are substantially vertical, extending from the plane 32 of the side wall towards the reaction chamber 20. The indention 34 is open outwards, in other words, there is a space formed in the indentation 34, which opens to the opposite side of the wall relative to the reaction chamber 20. In practice, the indentation 34 is provided in such a manner that at certain vertical lines within a horizontal distance from each other, the side wall 30.2 is provided with bends or changes of direction towards the central portion of the reaction chamber 20 in such a way that the wall surfaces after the bends or changes of direction are substantially opposing and the space between the bends or changes of direction forms the indentations 34. The walls surfaces are called herein indenting wall portions.

FIGS. 4 and 5 illustrate an embodiment, in which the fluidized bed reactor is at least partially supported by a supporting structure 40. The supporting structure 40 comprises at least vertical columns 42, which are arranged to be supported at least partially to a foundation 44 underneath the fluidized bed reactor 10. The columns 42 are arranged from the plane 32 of the side wall at least partially within the vertical indentations 34. Thereby, for example, the span of the horizontal beams of the supporting structure 40 between the columns 42 is less than the distance between the planes 32 of the opposing side walls. The fluidized bed reactor 10 can be supported to the supporting structure 40, for example, by hanger rods 46. Due to the reinforcing effect of the indentations 34, the reactor 10 also can be supported by using indenting wall portions as elements independently transferring load. The Figures illustrate two indentations 34 on both opposing walls, but it is clear that the number of the indentations 34 may vary.

Such an indentation 34 makes the side wall considerably more rigid and also renders the utilization of generated space possible, for example, for different purposes related to the operation of the fluidized bed reactor 10.

In FIGS. 4 and 5, two opposing side walls 30.2 and 30.4 are horizontally longer than the two other opposing walls 30.1, 30.3. Especially, then, the side walls 30.2 and 30.4 advantageously form more than one indentation 34 within a distance from each other.

Figure 6:
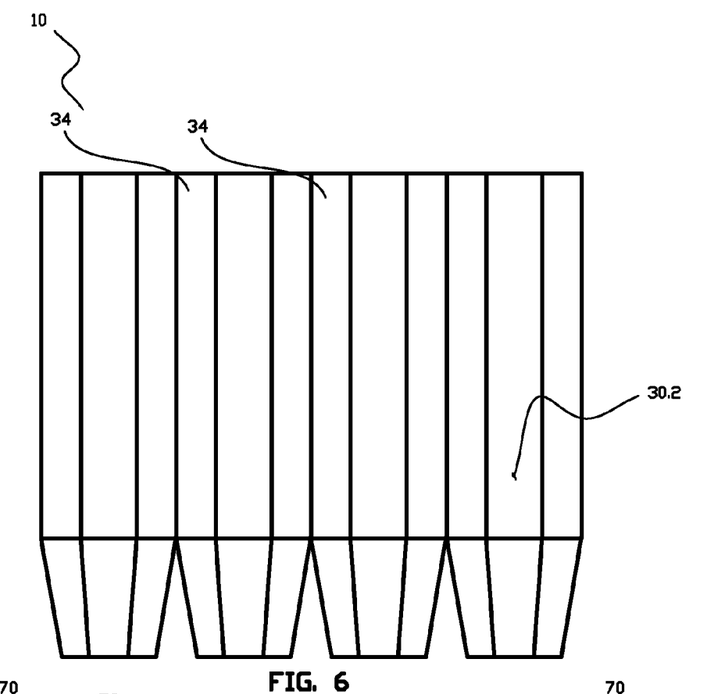
FIG. 6 is a schematic view of another embodiment of a fluidized bed reactor in accordance with the invention.
Figure 7:
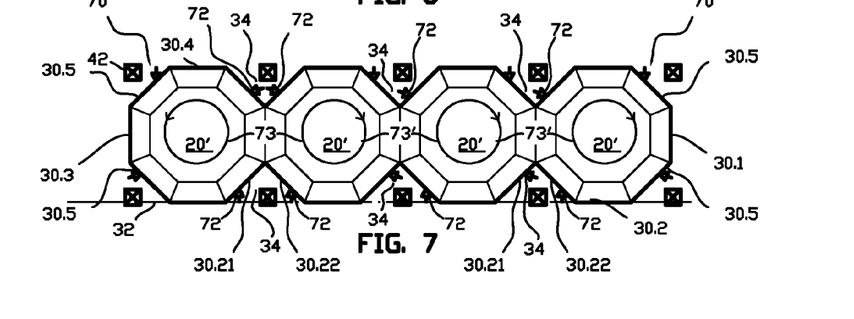
FIG. 7 is a schematic horizontal cross-sectional view of FIG. 6.

FIGS. 6 and 7 illustrate yet another embodiment in accordance with the invention. Here, the two horizontally longer side walls 30.2, 30.4 of the fluidized bed reactor 10 form three indentations 34, one after another and facing each other. The indentations 34 are wedge-like. More accurately, the indenting wall portions 30.21, 30.22 forming the indentation 34 are planar and equally long. Moreover, each corner 70 between a longer wall 30.2, 30.4 and a shorter wall 30.1, 30.3 are beveled, in other words, the beveled portion 30.5 is formed to follow the horizontal dimensions of the indenting wall portion of the indentation 34. In this embodiment, the beveled portion 30.5 is at its maximum, of the horizontal length, the maximum length being realized when the length of two beveled portions 30.5 and the length of the shorter side wall 30.1, 30.3 therebetween are equal. Thereby, a reaction chamber 20 is formed consisting of successive zones 20' having an octagonal horizontal cross section.

Such a reaction chamber 20 is preferably provided with an inlet for reaction gas (e.g., oxygenous combustion gas, in a boiler application) through indenting portions directed in such a way that each octagonal zone facilitates the generation of a vortex with a vertical central axis. Preferably, the indenting portions comprise means 72 for introducing reaction gas to the reaction chamber 20 in such a way that the introduction of reaction gas facilitates the generation of vertical vortex movement 73 in each of zone 20' of the reaction chamber 20 when in operation. For this reason, the means 72 for introducing reaction gas into a zone 20', connected to the subsequent corner surfaces and/or indenting wall portions 30.21, 30.22 are preferably directed progressively, for example, approximately aligned with the adjacent side wall or border between two zones. It is then possible to form into two adjacent zone vortices, which rotate either in the same direction 73 or in opposite directions 73, 73' at the border between two adjacent zones. The reactor illustrated in FIGS. 6 and 7 can be formed such that each zone therein has a separate grid, as has been disclosed herein, or the slanting wall portions between each of the two zones can be replaced by walls connecting the zones, whereby the reactor 10 has a continuous grid.

FIG. 7 also illustrates yet another embodiment of the invention, in which the vertical indentations 34 of the side walls comprise both means 72 for introducing reaction gas to the reaction chamber 20 and columns 42, arranged at least partially within the indentations 34.

Especially, with reference to FIG. 2, the fluidized bed reactor in accordance with an embodiment of the invention is a boiler with at least one side wall 30.2 of the reaction chamber 20 forming at least one indentation 34 outside the side wall relative to the furnace 20 of the boiler, which indentation 34 is substantially vertical, and extends from the plane 32 of the side wall towards the reaction chamber 20. Further, the lower portion L of the indentation 34 is provided with means 21 for introducing oxygenous gas. The lower portion can vertically extend for a certain distance above the inclined side wall, preferably, one third of the vertical length of the side wall. Moreover, in this embodiment, there are measuring means 23 for measuring quantities related to the process arranged in the middle and/or upper portion of the reactor 10 above the lower portion L of the indentation 34. Both the introduction of the gas and the arrangement of the measuring means to the indentation opening outwards is efficient, but yet simple and advantageous as for usability, as their maintenance is simple.

Figure 8:
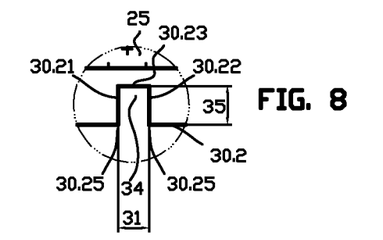
FIGS. 8-11 are various embodiments of the indentation.

FIG. 8 is a more detailed illustration of the indentation 34 of FIGS. 2 and 3. The indentation 34 is formed of a portion of the side wall 30.2, which protrudes from the plane of the side wall towards the reaction chamber 20. The portion of the side wall comprises at least two substantially vertical indenting wall portions 30.21, 30.22 deviating from the plane of the side wall at vertical lines 30.25 within a distance 31 from each other. In this manner, the indentation 34 is open outwards and the access to the interior of the indentation 34, for example, for maintenance, is easy. The distance 31 is preferably, in practice, at least 1 m. Moreover, the at least two substantially vertical indenting wall portions 30.21, 30.22 preferably extend towards the reaction chamber 20 for a distance 35, which is at least twice the distance 31 between the vertical lines 30.25.

The indenting wall portions are connected to each other by means of an end portion 30.23, which, in this embodiment, is also planar. When the indenting wall portions 30.21, 30.22 are, here, substantially perpendicular to the plane 32 of the side wall, the indentation thereby formed also will be substantially rectangular. Also, in this embodiment, both the indenting wall portions and the end portion is formed of the side wall, in other words, they are portions of the same water tube wall.

Figure 9:
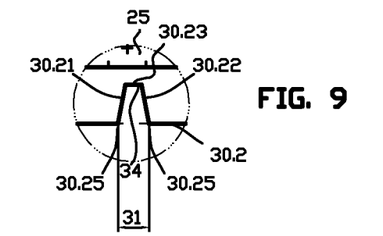
Figure 10:
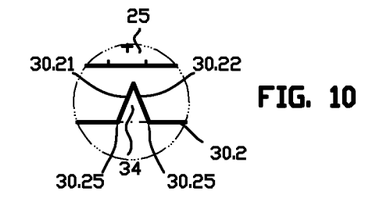
Figure 11:
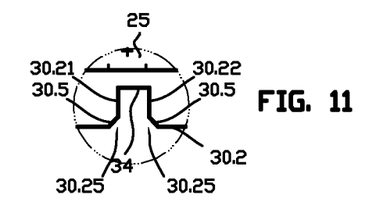

FIGS. 9-11 illustrate different embodiments of the indentation 34. The embodiment illustrated in FIG. 9 differs from that of the embodiment of FIG. 8 in such a manner that the end portion 30.23 therein is horizontally shorter than the distance 31 between the vertical lines 30.25.

FIG. 10 illustrates an embodiment, which differs from the embodiment of FIG. 8, in that the planar indenting wall portions therein are connected to each other to form a wedge-like indentation, which forms a triangular space in the indentation. Thereby, at the same time, an angle, which is larger than the right-angle, is formed at the vertical lines 30.25 on the side of the reaction chamber.

FIG. 11 illustrates an embodiment of the indentation 34 corresponding otherwise to the one illustrated in FIG. 8, except that the directions of the indenting wall portions 30.21, 30.22 are not defined at vertical lines, but the deviation locations 30.25 comprising two separate bends have equal angles forming together a substantially right angle. This can also be considered to be a kind of rounding provided by short planar intermediary portions 30.5. The intermediary portions are also called elsewhere in the present application beveled portions, referring to a planar intermediary portion. The use of short planar intermediary portions, in other words, beveled portions, decreases variation of the conditions caused by the corner of the furnace, which is important, especially in once-through boilers, in which maximum uniformity is required in the evaporation in the different portions of the furnace.

Figure 12:
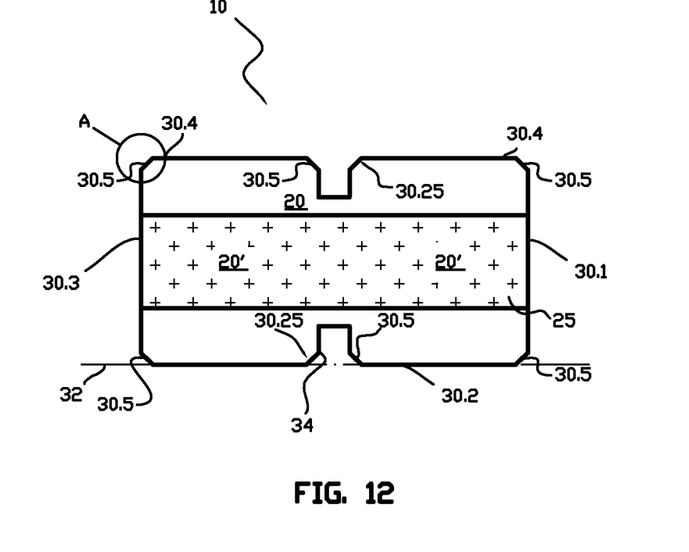
FIG. 12 is a schematic cross section of a fluidized bed reactor in accordance with an embodiment of the invention.

FIG. 12 illustrates a cross section of a once-through fluidized bed reactor 10 in accordance with an embodiment of the invention, which, preferably, is a once-through fluidized bed boiler, comprising a bottom portion 12, a roof portion (not shown) and side walls 30.1, 30.2, 30.3, 30.4, vertically extending between the bottom portion and the roof portion, forming the reaction chamber 20 of the fluidized bed reactor. The two opposing side walls 30.2, 30.4 of the reaction chamber are horizontally longer than two other opposing side walls 30.1, 30.3 of the reaction chamber. The reaction chamber thus has a substantially rectangular cross section. The side walls forming the reaction chamber comprise heat surfaces, preferably, water tube walls with parallel connected steam tubes, to form a portion of the evaporation system of a once-through boiler. According to a preferred embodiment, the evaporation tubes preferably have a smooth inner surface. In order to minimize the effects of the fluidized bed on the evaporation, inner corners of the reaction chamber 20 are provided with beveled portions 30.5, which connect adjacent side walls and are connected with the adjacent walls to the same evaporation system of the once-through boiler. The beveled portions are preferably planar and they extend throughout the vertical length of the wall.

Figure 12A:
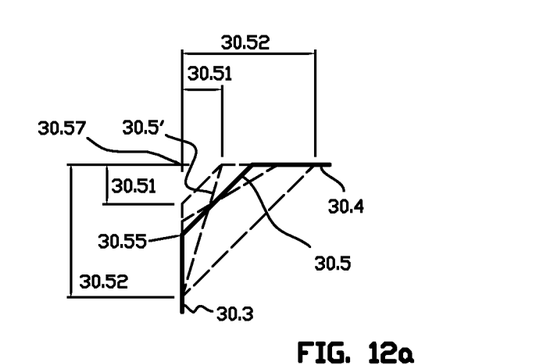
FIG. 12a is a detail A of FIG. 12.

A detail A of FIG. 12 is shown in more detail in FIG. 12a, which illustrates preferred embodiments 30.5' of the beveled portion 30.5 of the invention. The distance of the folding point 30.55 of the beveled portion 30.5' from the cross point 30.57 of the planes of the side walls can, according to the invention, vary from the minimum distance 30.51 to the maximum distance 30.52. The minimum distance is about 150 mm and the maximum distance is about 500 mm. A thick, continuous line in FIG. 12a illustrates a preferred embodiment, in which the folding point is on both side walls 30.3, 30.4 at the distance of about 350 mm from the cross point of the planes of the side walls, whereby the width of the beveled portion is about 500 mm. In some embodiments, it is possible to arrange the folding points on the two side walls to different distances from the cross point of the planes of the side walls.

The two opposing, longer side walls of the reaction chamber 20 comprise at least one substantially vertical indentation 34, extending from the plane of the side wall towards the reaction chamber, and in which the inner angles on the reaction chamber side of the side wall of the indentation are provided with beveled portion 30.5. Preferably, the indentations are facing each other on the opposing side walls, whereby at least two adjacent zones 20' are formed in the reaction chamber, in which each portion of the reaction chamber formed by a zone comprises in all inner angles a beveled portion. The zones comprise a common grid 25 in the reactor. Thereby, the effect of the fluidized bed on the adjacent evaporation tubes will become very uniform and the evaporation process of the once-through boiler can be controlled better than before.

Figure 13:
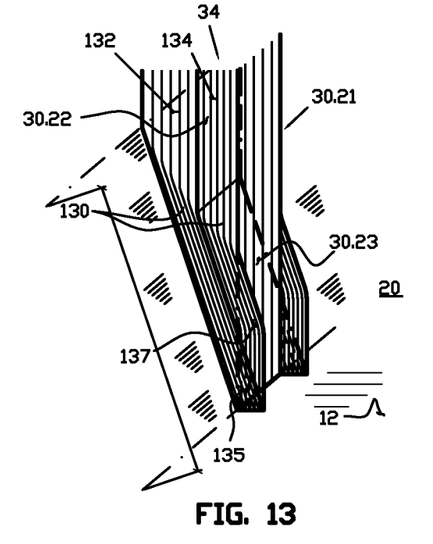
FIG. 13 is a schematic view of another embodiment of the indentation.

FIG. 13 shows an embodiment of an indentation 34 of a once-through fluidized bed boiler 10 in accordance with the invention. The indenting wall portions 30.21, 30.22 forming the indentation are planar and they are formed of water tube wall structure 130. The water tubes of the indenting wall portions 30.21, 30.22 forming the indentation 34 are planar and they are formed of water tube structure 134. The upper portions of the water tubes of the indenting wall portions are vertical and they are bent to run planar from the side wall to be parallel with the inclined portion and extend down to bottom portion 12. The indenting wall portions 30.21, 30.22 are formed of two water tube groups 132, 134, of which the first water tube group 132 is arranged in connection with the side wall and the second water tube group 134 is arranged as an extension of the first water tube group to extend planar away from the wall of the reactor. The tubes of the first water tube group 132 are bent to run substantially parallel with the side wall down to the plane of the grid. The tubes of the second water tube group 134 are also arranged to run substantially parallel with the side wall until they are bent in such a manner that the second water tube group folds by the side of the first water tube group, when it is at the level of the grid of the bottom portion 12. In the figure, reference number 13 refers to the area, in which the water tube groups are substantially overlapping. The end portion 30.23 of the indentation has been arranged to run from the upper portion directly to the level of the grid of the bottom portion 12. In this embodiment, the second water tube group 134 is completely subjected to the effect of the fluidized bed at the area shown by reference number 137, in other words, heat is transferred to the water tubes from both sides. Especially, when this embodiment is used in a once-through fluidized bed boiler, one side of the second water tube group 134 is preferably provided in the area 137 with a refractory layer for heat insulation, in other words, one side is coated with a sufficient amount of insulating heat coating. This way, the effect of the fluidized bed and combustion process on the first and the second parallel water tube groups can be balanced in such a manner that the heat transfers well enough correspond to each other. Thereby, the stresses caused by nonhomogeneous heat transfer on the structure of the water tube wall of the once-through boiler will be minimized.

Figure 14:
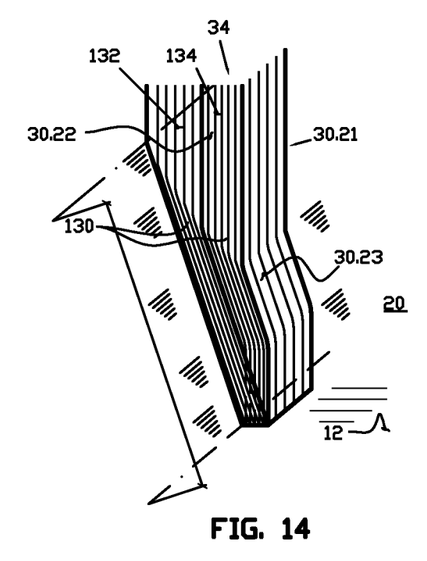
FIG. 14 is a schematic view of yet another embodiment of the indentation.

FIG. 14 discloses another embodiment of an indentation 34 of a once-through fluidized bed boiler 10 in accordance with the invention. The indenting wall portions 30.21, 30.22 are also here planar, and they are formed of water tube structure 130. The water tubes of the indenting wall portions are arranged in the manner shown in FIG. 13. The end portion 30.23 of the indentation is arranged to run in such a manner that it is aligned with the outer edge of the second water tube group 143 of the indenting wall portions and is thus connected to the second water tube group gas-tight forming the indentation 34. When the end portion is arranged in this manner, the second water tube group 134 remains behind the end portion in the area 135 shown in FIG. 13 and is, therefore, in this area not in direct connection with the furnace.

A third alternative (not shown in the figures), is that all tubes of both indenting wall portions of the indentation extend after the first bend parallel down to the grid, and the end portion of the indentation correspondingly extends parallel with the outer edge of the outer water tube group down to the grid. In this alternative, the heat transfer on each tube is throughout the distance approximately the same. A disadvantage herein is that the indentation 34 extends deeper in the grid area than in the alternatives shown in FIGS. 13 and 14, which diminishes the surface are of the grid.

It must be noted that the invention has been described herein by way of a few most preferred embodiments. Thus, it is to be understood that the invention is not limited to the disclosed embodiments, but is intended to cover various combinations or modifications of its features and several other applications included within the scope of the invention as defined in the appended claims. Features illustrated in connection with different embodiments can also be utilized within the basic concepts of the invention in connection with the other embodiments and/or combined in different combination, if so desired, and if the technical possibilities for them exist.

The invention claimed is:

1. A fluidized bed reactor comprising:
a bottom portion;
a roof portion; and
side walls vertically extending between the bottom portion and the roof portion, forming a reaction chamber of the fluidized bed reactor,
wherein at least one side wall of the reaction chamber forms at least one vertical indentation in the reaction chamber, which indentation extends from the plane of the at least one side wall towards the reaction chamber, and
wherein the indentation extending from the plane of the at least one side wall towards the reaction chamber is formed of a portion of the at least one side wall, protruding from the plane of the at least one side wall towards the reaction chamber, and the portion of the at least one side wall comprises at least two substantially vertical indenting wall portions deviating from the plane of the at least one side wall at vertical lines within a distance from each other.

2. A fluidized bed reactor according to claim 1, wherein the at least one indentation extends vertically throughout the length of the at least one side wall between the bottom portion and the roof portion.

3. A fluidized bed reactor according to claim 1, wherein the side walls and the at least one indentation are formed of water tuber walls, to which heat can be transferred from the reaction chamber.

4. A fluidized bed reactor according to claim 1, wherein two opposing side walls of the reaction chamber comprise at least one vertical indentation extending from the plane of the at least one side wall towards the reaction chamber.

5. A fluidized bed reactor according to claim 4, wherein the two opposing side walls of the reaction chamber are horizontally longer than two other opposing side walls of the reaction chamber.

6. A fluidized bed reactor according to claim 4, wherein the fluidized bed reactor is at least partially supported by a supporting structure, which supporting structure comprises vertical columns supported by a foundation at least partially underneath the fluidized bed reactor, wherein the columns are arranged at least partially within the vertical indentations.

7. A fluidized bed reactor according to claim 1, wherein the distance of the vertical lines is at least one meter.

8. A fluidized bed reactor according to claim 7, wherein the at least two substantially vertical indenting wall portions extend towards the reaction chamber for a distance that is at least twice the distance between the vertical lines.

9. A fluidized bed reactor according to claim 7, wherein the edges on the reaction chamber side of the at least two substantially vertical indenting wall portions are connected with each other by an end portion.

10. A fluidized bed reactor according to claim 1, wherein the indentation comprises a feed for introducing oxygenous reaction gas to the reaction chamber above the bottom portion.

11. A fluidized bed reactor according to claim 1, wherein the at least two substantially vertical indenting wall portions are planar.

12. A fluidized bed reactor according to claim 11, wherein the at least two substantially vertical indenting wall portions are at an angle deviating from the normal of the side wall plane in such a way that they extend towards the reaction chamber to form one of a triangular and a wedge-shaped indentation.

13. A fluidized bed reactor according to claim 5, wherein the two indentations facing each other are arranged on two opposing side walls of the reaction chamber.

14. A fluidized bed reactor according to claim 13, wherein the two indentations facing each other comprise a feed for introducing reaction gas to the reaction chamber and the feed is directed in such a position relative to the side wall plane that the introduction of the reaction gas facilitates the generation of a vortex motion in the reaction chamber, when in operation.

15. A fluidized bed reactor according to claim 2, wherein the side walls and the at least one indentation are formed of water tuber walls, to which heat can be transferred from the reaction chamber.

16. A fluidized bed reactor according to claim 5, wherein the fluidized bed reactor is at least partially supported by a supporting structure, which supporting structure comprises vertical columns supported by a foundation at least partially underneath the fluidized bed reactor, wherein the columns are arranged at least partially within the vertical indentations.

17. A fluidized bed reactor according to claim 12, wherein the two indentations facing each other are arranged on two opposing side walls of the reaction chamber.

18. A fluidized bed reactor according to claim 1, wherein the indentation comprises a feed for introducing fuel to the reaction chamber.

19. A fluidized bed reactor in accordance with claim 1, wherein the indentation comprises at least one sensor for measuring a quantity related to a reaction taking place in the reaction chamber.

* * * * *